United States Patent [19]

Ehrlinger et al.

[11] 4,373,359
[45] Feb. 15, 1983

[54] HYDROSTATIC-MECHANICAL GEAR UNIT

[75] Inventors: Friedrich Ehrlinger, Friedrichshafen; Michael Meyerle, Meckenbeuren, both of Fed. Rep. of Germany

[73] Assignee: Zahnradfabrik Friedrichshafen A.G., Friedrichshafen, Fed. Rep. of Germany

[21] Appl. No.: 147,863

[22] Filed: May 8, 1980

[30] Foreign Application Priority Data

May 8, 1979 [DE] Fed. Rep. of Germany ....... 2918448

[51] Int. Cl.³ ...................... F16H 47/10; F16H 37/08
[52] U.S. Cl. ...................... 74/687; 74/695; 74/705
[58] Field of Search ............... 74/687, 688, 681, 705, 74/695

[56] References Cited

U.S. PATENT DOCUMENTS

| 3,411,382 | 11/1968 | Mori | 74/688 |
|---|---|---|---|
| 3,534,632 | 10/1970 | Smith | 74/687 |
| 3,577,804 | 5/1971 | Ohno | 74/688 |
| 3,580,107 | 5/1971 | Orshansky | 74/687 |
| 3,596,535 | 8/1971 | Polak | 74/687 |
| 3,667,321 | 6/1972 | Maurice | 74/687 |
| 3,714,845 | 2/1973 | Mooney, Jr. | 74/687 |
| 3,733,931 | 5/1973 | Nyman et al. | 74/687 |
| 3,783,711 | 1/1974 | Orshansky, Jr. | 74/687 |
| 3,903,755 | 9/1975 | Polak | 74/687 |
| 3,979,972 | 9/1976 | Sakai et al. | 74/687 |
| 4,008,628 | 2/1977 | Orshansky, Jr. | 74/687 |
| 4,019,404 | 4/1977 | Schauer | 74/687 |
| 4,259,881 | 4/1981 | Meyerle | 74/687 |
| 4,286,477 | 9/1981 | Meyerle et al. | 74/687 |
| 4,291,592 | 9/1981 | Meyerle et al. | 74/687 |

FOREIGN PATENT DOCUMENTS

| 2405804 | 8/1974 | Fed. Rep. of Germany | 74/687 |
|---|---|---|---|
| 2415002 | 10/1974 | Fed. Rep. of Germany | |
| 2757191 | 7/1979 | Fed. Rep. of Germany | |
| 2758659 | 7/1979 | Fed. Rep. of Germany | |
| 2904065 | 8/1980 | Fed. Rep. of Germany | 74/688 |
| 1256700 | 2/1961 | France | 74/681 |
| 901967 | 7/1962 | United Kingdom | |
| 997085 | 3/1963 | United Kingdom | 74/687 |
| 1092316 | 11/1967 | United Kingdom | |
| 1364962 | 8/1974 | United Kingdom | |
| 1381689 | 1/1975 | United Kingdom | |
| 1411909 | 10/1975 | United Kingdom | |
| 1454702 | 11/1976 | United Kingdom | |
| 2037915 | 7/1980 | United Kingdom | 74/687 |

OTHER PUBLICATIONS

Society of Automotive Engineers-720724-Sep. 11, 1972.

Primary Examiner—Allan D. Herrmann
Attorney, Agent, or Firm—Lyon & Lyon

[57] ABSTRACT

A hydrostatic-mechanical gear unit wherein input power is divided into an hydraulic power branch and a mechanical power branch. The hydraulic branch includes two hydrostatic units in tandem. Through gearing the hydraulic branch is directed to a first internal gear for transmitting the rotational hydraulic power. The mechanical branch through gearing leads to a second internal gear for transmitting rotational mechanical power. The internal gears together with pinions form part of a planetary wheel set for integrating the mechanical power and the hydraulic power. An intermediate shaft connected to the pinion carrier conveys power to an output shaft through a coupling in a first forward driving stage and in the reverse driving stage, and a coaxial shaft connected with a sun wheel conveys power to the output shaft through a coupling in a second forward driving stage.

20 Claims, 4 Drawing Figures

HYDROSTATIC-MECHANICAL GEAR UNIT

BACKGROUND

This invention relates to a hydrostatic-mechanical gear unit. A gear unit of the kind with which the invention is related is described in German Application P No. 27 58 659.0-12, which is not yet published.

Hydrostatic-mechanical gear units are known in the art, for example, from the SAE publication No. 72 0724 of September 1972. In such a gear unit there is a four-shafted planet wheel gear, which functions as an integrator gear unit for the hydraulic power branch and the mechanical power branch. In known mechanisms, in the first forward driving stage and in the reverse driving stage, the drive of the output takes place purely hydrostatically. Under these conditions, the gear unit pressure angle (the product of maximum starting traction and final speed, or the product of maximum starting torque and maxiumum starting speed of the gear unit) is lower than necessary. This results in a high specific hydrostatic load, short operating life, poor shifting quality and high weight per horsepower and volume per horsepower of the unit. In addition, there is only a low reverse speed or gear unit pressure angle in the reverse stage.

German publication DE-AS No. 24 15 002 discloses another hydrostatic-mechanical gear unit which has two hydrostatic-mechanical forward stages and, depending upon the specific type of construction, two reverse stages. Here, however, it is not possible to design at low expense the gear unit with only a single reverse stage, for instance, as required by sweepers. The reverse stage is dependent upon a reversing gear with two shifting couplings built into the mechanical power branch. The gear unit must thus, as a matter of principle, thus be designed with four couplings, which brings about equal forward and reverse driving conditions. The couplings for the first and second stages are designed a head of the integrator gear unit in the hydraulic power branch. Consequently, the total speed of the different shaft components of the integrator gear unit is higher, with the result that whereby the component parts are subject to a higher load and are noiser. In general, a necessary consequence of such a gear unit is that one shaft component of the integrator gear unit rotates in the final gearing together with the multiple ones at the speed of the driving motor or the speed of the shaft which is connected with the drive shaft. In DE-AS No. 24 15 002, this shaft has, in the starting range, to transfer the starting torque so it must accordingly be constructed as a cross-piece or internal gear wheel taking up a relatively large volume.

Further disadvantages include the unfavorable efficiency due to higher shaft losses, in particular through the reversing gear unit in the mechanical power branch which is shifted in between there, the more unfavorable design, and the weight and volume per horsepower.

The gear unit described above in Patent Application No. P 27 58 659.0-12 provides a number of advantages over the mechanisms known in the art. Included in these advantages are that a continuous speed control is possible over at least two forward drive stages, whereby in the first stage the gear unit pressure angle corresponds to double the hydrostatic pressure angle.

In each operating condition there is a hydraulic-mechanical power transfer with a small proportion being hydraulic power (hydraulic power on the average being below 30 percent) and thus there is particularly good efficiency. Additionally, high gear unit pressure angle or power yield of the hydrostatic gear unit can be obtained, thereby providing smaller weight and volume per horsepower. Alternatively, small, economical hydrostatic units can be used.

There is also a low load on the hydrostatic gear unit; low hydraulic idle power; and high shifting quality, since there is an extensive range of continuous traction and efficiency in shifting. The starting power can be greater than the hydrostatic pressure angle. The well-known disadvantage of the initial breakaway torque of the hydromotor is eliminated, since both hydrostatic units at the starting point are in rotation. This brings about a further heightening of the starting tractions and, in addition, better starting characteristics.

Only one, not both, hydrostatic unit to be controlled, the construction can be compactly adapted to the vehicle, and the greatest torque occurs in the planet carrier which means that there is a small specific tooth load and leading to a more economical construction.

The present invention is directed to providing a power-branched gear unit which has a more compact construction, is better suited to the vehicle, and with a lower gear unit weight and volume, provides a high conversion range or gear unit pressure angle. Additionally, the gear unit construction can with these features be adapted for different types of vehicles—such as sweepers, construction machines, commercial vehicles and possibly buses.

SUMMARY OF INVENTION

A hydrostatic-mechanical gear box comprises an input shaft for receiving power from an engine, power in the shaft being divided into a hydraulic power branch and a mechanical power branch. The hydraulic power branch includes a first hydrostatic unit operatively connected with a second hydrostatic unit, and the input shaft is adapted to drive the first hydrostatic unit, and an output hydrostatic shaft adapted to be driven from the second hydrostatic unit. Gearing means engaging the output hydrostatic shaft transmits rotational power to a planetary wheel set. The mechanical power branch includes gearing operatively engaging the input shaft and engaging the planetary wheel set, and adapted to impart a rotational power to the planetary wheel set. The planetary wheel set is adapted to integrate the hydraulically activated power rotation of the set and the mechanically activated power rotation of the set. An intermediate shaft is selectively driven by the planetary wheel set, and coupling means for engaging the intermediate shaft and an output shaft transmits rotational power to the output shaft when the gear unit is in a first driving stage.

A coaxial shaft is mounted about the intermediate shaft and is adapted to be selectively driven by the planetary wheel set when the gear unit is in a second forward driving stage and the coupling means disengages the intermediate shaft with the output shaft and engages the coaxial shaft with the output shaft and thereby transmits power to the output shaft.

The intermediate shaft is selectively driven by the planetary wheel set when the gear unit is in a reverse driving stage and is adapted to drive a reverse driving shaft which engages the output shaft through coupling means thereby to drive the output shaft in reverse.

DRAWINGS

The invention is further described with reference to the accompanying drawings which are:

DETAILED DESCRIPTION OF THE DRAWINGS

Figure 1:
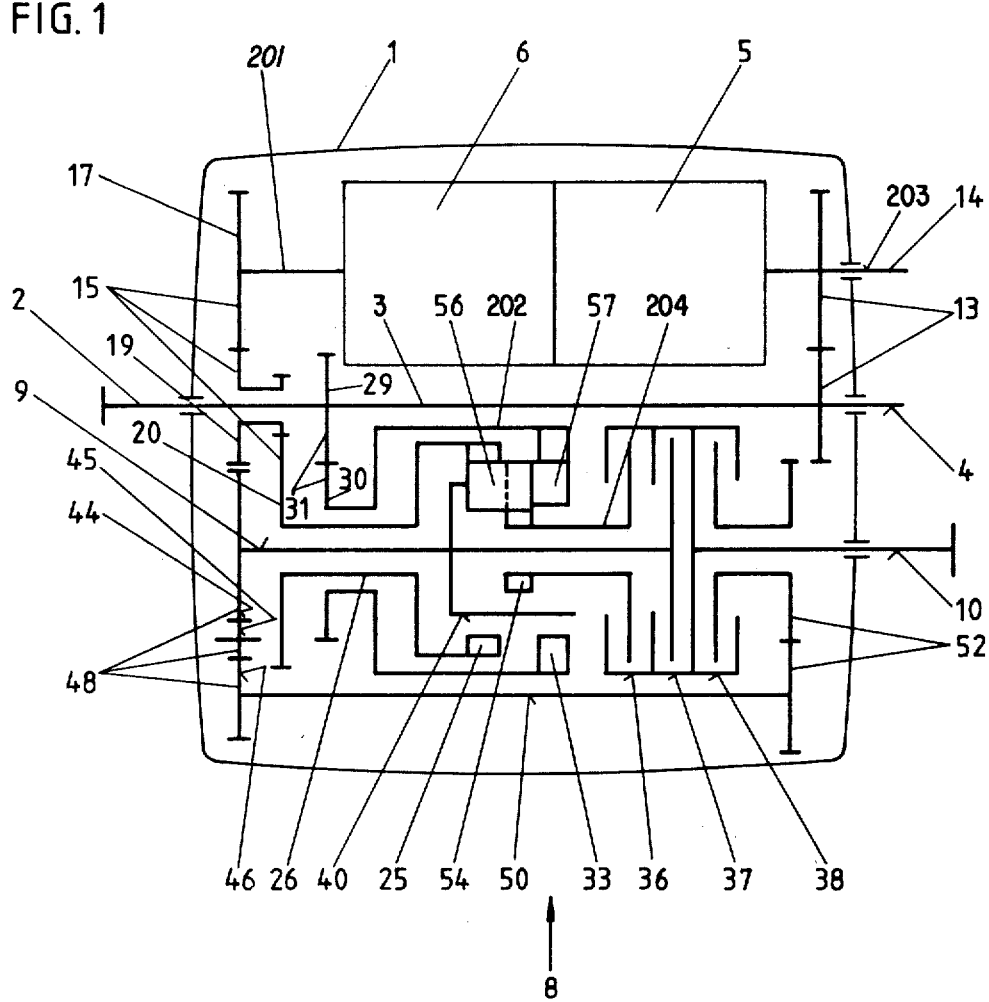
FIG. 1 is a schematic representation of the gear unit in the general basic construction form suitable for street vehicles.

In FIG. 1 there is shown a gearbox 1, a drive shaft 2 from an engine, an input shaft 3 connected with the drive shaft 2, and a tap shaft 4. There is also a first hydrostatic unit 5 which can be modified in its conveyor volume and a second hydrostatic unit 6, preferably, with constant conveyor volume. An integrator gear unit 8 includes a planetary wheel set and is concentric to an intermediate shaft 9 which is parallel to and concentric with this input shaft 3. Coaxially with the shaft 9 is an extension which is the output or power take-off shaft 10.

The hydraulic branch for power flow is formed from the input shaft 3 through a gear wheel stage 13 mounted at the output end of the input shaft 3 for rotation with the shaft 3, and a hydrostatic shaft 14 which lead to the hydrostatic unit 5 and the hydrostatic unit 6. The output of hydrostatic unit 6 drives, through an output hydrostatic shaft 201, a gear wheel stage 15 at the output hydrostatic shaft, consisting of the gear wheel 17, and a double sun wheel 19, which rotates on the input end of the input shaft 3, and, in turn, a gear wheel 20 connected to an internal gear wheel 25, which is the first shaft of the planetary wheel set generally indicated by numeral 202. The hydrostatic shaft is parallel and adjacent to the input shaft 3. The gear wheel 20 and the internal gear wheel 25 are concentric to the intermediate shaft 9 and are connected to each other in a fixed position via a hollow shaft 26. The hydrostatic shaft 14 provides an extension 203 which can also be used as a first auxiliary shaft responsive to the speed of the input shaft 3 and consequently the speed of the driving engine.

The mechanical branch for power flow is formed from the input shaft 3 through a gear wheel stage 31 which consists of gear wheels 29 and 30, and in turn leads to an internal gear wheel 33, which is the second shaft of the planetary wheel set 202. The gear wheels 29 and 30 are substantially adjacent the gear wheels 31 on the intermediate shaft 9 driven by the double sun wheel 19.

Coaxially arranged with regard to the planetary wheel set 202 are three couplings 36, 37 and 38.

In the first driving stage, the power take-off from the planetary wheel set 202 occurs through a first output means being a planet gear carrier 40 to coupling 37. The planet gear carrier 40, which is the third shaft of the planetary wheel set 202, is connected with the intermediate shaft 9 in fixed relationship.

In the reverse driving stage the power flows from the planetary wheel set 202 through the intermediate shaft 9, a gear wheel stage 48 consisting of the gear wheels 44, 45 and 46, to a reverse driving shaft 50 mounted parallel to the intermediate shaft 9, input shaft 3 and hydrostatic stage 14. Power then flows through a further gear wheel stage 52 to coupling 38, from which a connection to the output shaft 10 is created.

In the second forward-driving stage, the power take-off from the planetary wheel set 202 is through a second output means being a sun wheel 54, which is a fourth shaft of the planetary wheel set 202 and coaxial shaft 204, and then to a coupling 36.

The planetary wheel set 202 of the integrator is constructed in such a way that on the planetary gear carrier 40 there are two sets of planetary pinions 56 and 57. These pinions 56 and 57 mesh with each other and rotate about the carrier 40. The planetary pinion 56 is in constant mesh with the internal gear wheel 25 through which the power from the hydraulic branch flows, and also with the first sun wheel 54. Planetary pinion 57 constantly meshes with the internal gear wheel 33 through which the power from the mechanical branch flows to the planetary wheel set 202.

Figure 4:
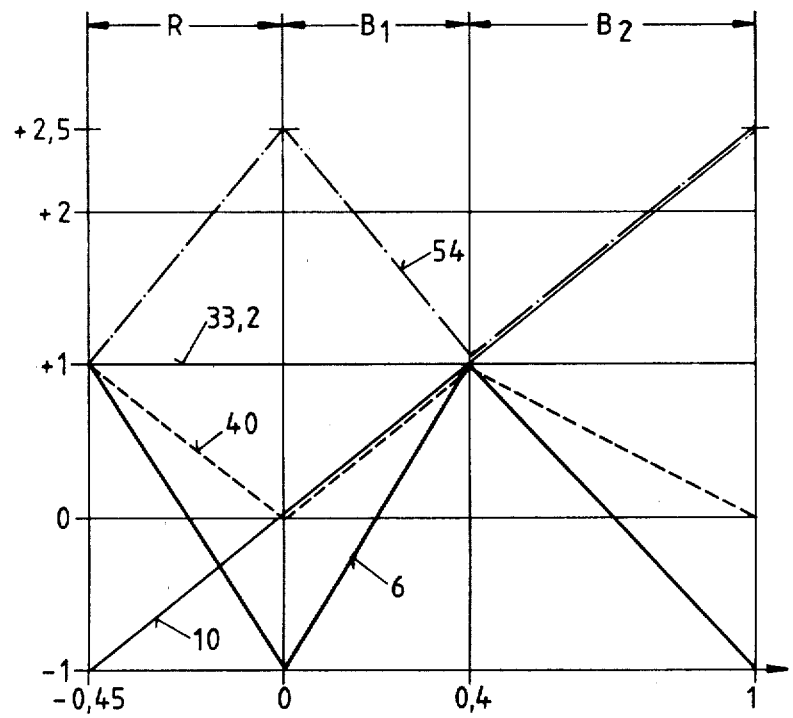
FIG. 4 is a rotation scheme of the gear unit as per FIG. 1, FIG. 2 and FIG. 3.

The operation of the gear unit is described below on the basis of the rotation rate scheme in FIG. 4.

At the starting point, the hydrostatic unit 5 is positioned at its maximum negative setting. The coupling 37 for the first forward driving stage is closed and connected with the output shaft 10. The rotation rate of output shaft 10 is zero because of the corresponding opposition of the first shaft, namely, the internal gear wheel 25, which is in drive connection with the second hydrostatic unit 6, to the second shaft, namely, the internal gear wheel 33, which is mechanically connected with the input shaft 3.

When the hydrostatic unit 5 is brought towards a zero setting, the rotation rate of the internal gear wheel 25 is reduced relative to the rotation rate of internal gear 33 which remains at a relatively constant speed. Thereupon a positive rotation of the planet gear carrier 40 is created, and thereby an output step rotation rate for forward driving is created. By moving the setting of hydrostatic unit 5 up to the zero conveyor position and onwardly past zero to its maximum positive position, all components of the planetary wheel set 202 reach synchronous running.

At this operating point, shifting into the second forward driving stage can be made through opening of the coupling 37 and simultaneously closing of the coupling 36. The output shaft 10 is now connected with the sun wheel 54. Increased power take-off on output shaft 10 can now be obtained by returning the setting of the hydrostatic unit 5 to its maximum negative setting, thereby increasing the rotation rate of the planetary pinion 56 and thereby increasing the rotational speed of the sun wheel 54.

In the reverse driving stage, the functional operating sequence is essentially the same as the first forward driving range. The planet gear carrier 40 is connected with the intermediate shaft 9 through the gear wheel stage 48, the reverse driving shaft 50 and the gear wheel stage 52, and by closing coupling 38 to the output shaft 10, reverse rotation is effected.

Figure 2:
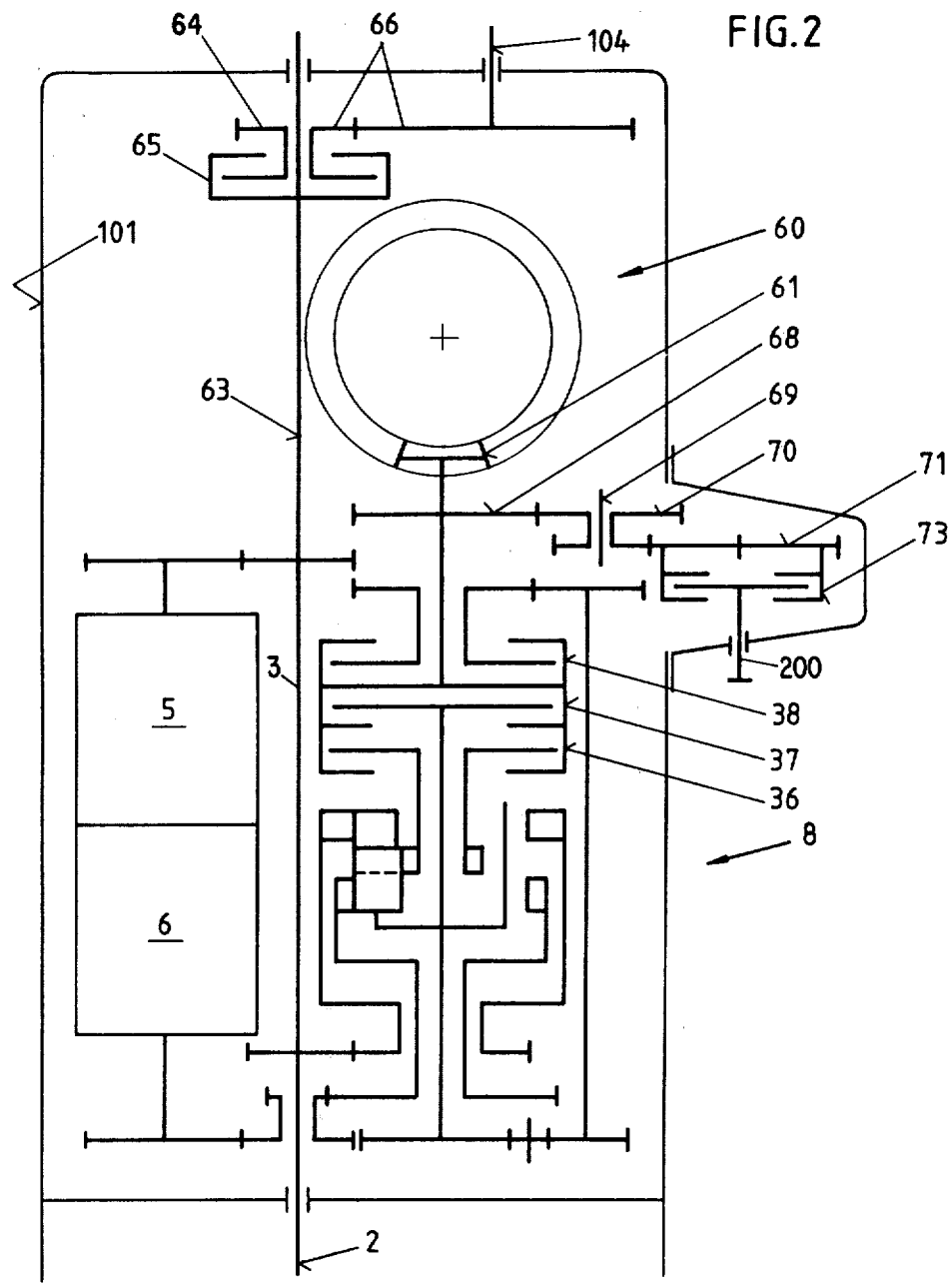
FIG. 2 is a schematic representation of a modification of the gear unit of FIG. 1, suitable for a sweeper.

In the embodiment of FIG. 2 which is an adaptation of the gear unit of FIG. 1 to a sweeper, there is an axle differential 60 which leads from output shaft 10, to the two back wheels (not shown in greater detail) as an integral part in the gearbox 101. The power take-off here is from a bevel gear 61 (located on the output shaft 10) directly onto the axle differential 60.

An extension 63 of the input shaft 3 leads directly through the axle differential 60 to a tap shaft coupling 65 and a tap shaft gear unit 64 with a spur wheel stage 66, which drives a tape shaft 104 according to the rate of rotation of the driving engine to input shaft 2 and consequently input shaft 3.

An additional front-wheel drive is also provided. On the output shaft 10 there is an additional gear wheel 68 which meshes with a stage gear wheel 70 rotating on an intermediate shaft 69, which again engages with a gear wheel 71. By coupling the shaft 200 through an additional coupling 73, the output front-wheel drive shaft 200 can engage the rotating gear wheel 71.

Figure 3:
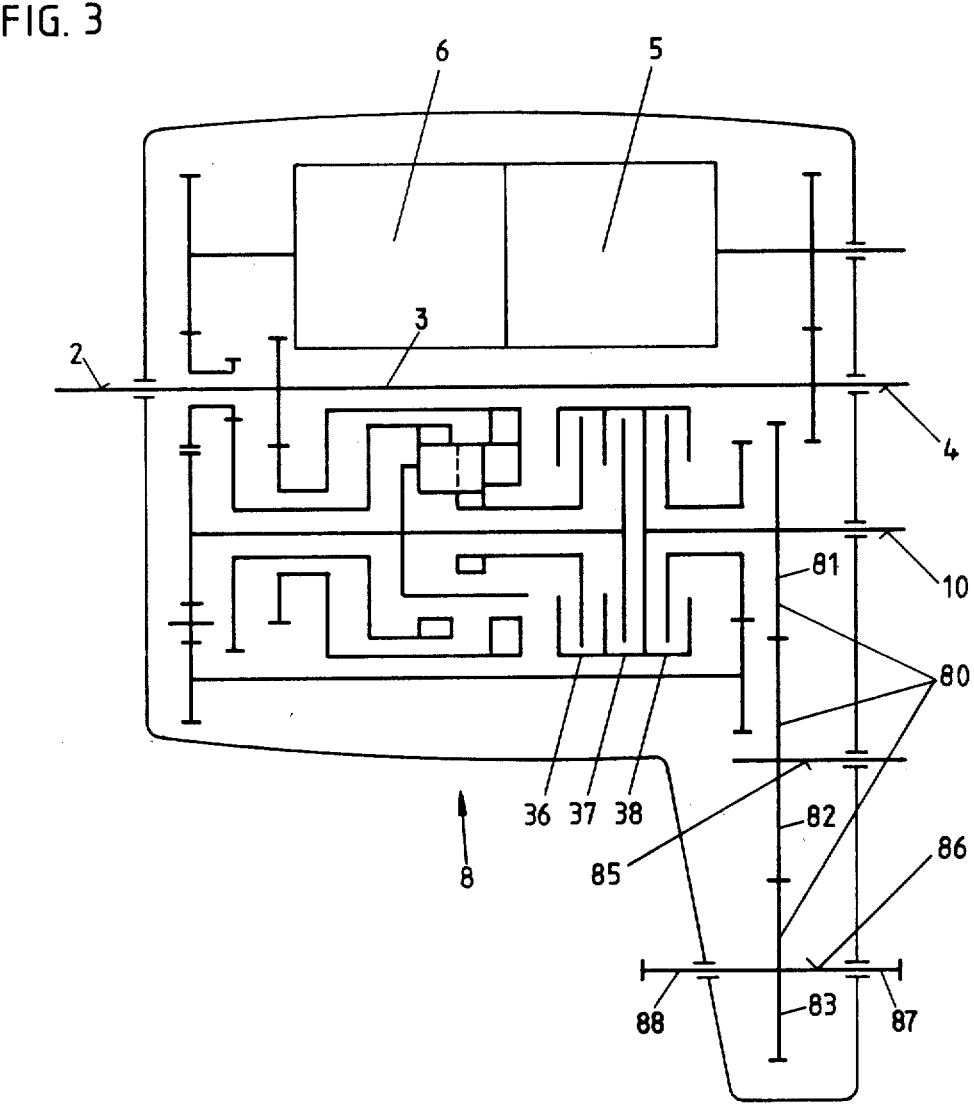
FIG. 3 is a schematic representation for modification of the gear unit of FIG. 1 suitable for a wheel loader or similar construction machine, for instance, loader tractors, bulldozers.

In FIG. 3 there is a further embodiment of the power-branched gear unit of FIG. 1 adapted for a wheel loader. The power flow takes place from the output shaft 10 through a power take-off train 80, consisting of the gear wheels 81 and 82 which mesh with each other, and in turn from gear wheel 82 to 83, such gear wheels meshing together. Gear wheel 81 is on the output shaft 10, the gear wheel 82 on an intermediate shaft 85 and the gear wheel 83 on an end power take-off shaft 86 with two power take-off connections 87 and 88. Power take-off thus takes place from connections 87 and 88 for front and rear wheels of a loader.

Among the advantages which are obtained from the invented gear unit are that the power take-off is from two changeable shaft components of the planetary wheel set 202 of integrator gear unit 8. It is possible to change the first driving stage and the reverse stage from a single shaft component, intermediate shaft 9. The reverse range can be designed with an optional final speed and thus it is possible to adapt the reverse driving stage for a particular vehicle with only one coupling.

In setting the first driving stage at approximately 15 km/h, the best operating point lies at approximately 7.5 km/h, where the hydraulic power is zero. In the primary operating range between 5 and 10 km/h, the proportion of hydraulic power on the average is approximately 20 percent, which corresponds to a favorable efficiency of the gear unit.

In comparison to known systems, there is the additional advantage in that the power take-off components of the planetary wheel set of the integrator gear unit can be directly connected with the output shaft and thus further power losses on the shaft are eliminated. There are also the advantages of a smaller construction and lower costs.

Through the coaxial arrangement of the planetary wheel set of the integrator gear unit and the stage couplings, it is possible to lead the input shaft 3 through the gear unit as a tap shaft 4 without intermediate components. The output shaft with the axle space dimensioned as required by the vehicle (for example the tap shaft for the drive of the differential gear unit of a sweeper, is 115 mm), can drive directly onto the starting bevel pinion of the vehicle axle. Through the complete power utilization of the hydrostatic units 5 and 6 as a result of the complete positive and negative adjustment within each of the driving stages, a high conversion range is attained with relatively small hydrostatic component units.

Through the type of the arrangement of the hydrostatic units as well as the above-mentioned construction details, there is obtained a compact construction, well adapted to a vehicle and having optimum weight and volume per horsepower.

As a result of the alternate shiftability of the two power take-off shafts namely, intermediate shaft 9 and coaxial shaft 204, of the planetary wheel set 202, there are fewer rotations of the individual shaft components of the wheel set of the integrator gear unit 8. The advantages resulting from this are less load on the component parts, quite behavior and a higher operating life.

The specific gear unit construction permits at least two auxiliary drives dependent upon the rotation rate of the driving engine, and hence input shaft 3, to be connected for operating pumps in a highly advantageous way. Through only a slight modification, the power branched gear unit can be adapted for the requirements of a sweeper. Further, another power take-off train, can be provided, for example, in wheel loaders, to increase the space of the input shaft 3 to the output shaft, and also to obtain a power branching for front and rear axle drives.

In other examples of the invention, there is the possibility of an auxiliary power take-off from the hydrostatic shaft 14 and the tap shaft 4, the power take-off being dependent on the rotation rate of the drive shaft 2 from the engine.

Further, by an extension of the output shaft 10, as well as of the intermediate shaft 85, auxiliary power take-offs dependent upon the speed of the vehicle can be provided, for instance, of emergency steering pumps. Emergency steering pumps are important in order to enable the vehicle to be safely towed off in the event of the loss of a driving source. The necessary pressure to the hydrostatic steering support can be generated.

The present embodiments of the invention are to be considered in all respects as illustrative and not restrictive, the scope of the invention being indicated by the appended claims rather than by the foregoing description.

We claim:

1. A hydrostatic-mechanical gear unit comprising an input shaft for receiving power from an engine, means for dividing power in the shaft into a hydraulic power branch and a mechanical power branch, the hydraulic power branch including a first hydrostatic unit operatively connected with a second hydrostatic unit, the input shaft being adapted to drive the first hydrostatic unit, and an output hydrostatic shaft adapted to be driven from the second hydrostatic unit, a planetary wheel set, gearing means for engaging the output hydrostatic shaft to transmit rotational power to said planetary wheel set, the mechanical power branch including gearing operatively engaging the input shaft and engaging the planetary wheel set, and adapted to impart rotational power to the planetary wheel set, the planetary wheel set being adapted to integrate the hydraulically activated rotation and the mechanically activated rotation, and intermediate shaft selectively driven by a first output means from the planetary wheel set, and coupling means for engaging the intermediate shaft and an output shaft and to thereby transmit rotational power to the output shaft when the gear unit is in a first driving stage, a coaxial shaft about the intermediate shaft and adapted to be selectively driven by a second output means from the planetary wheel set when the gear unit is in a second driving stage, the coupling means disengaging the intermediate shaft from the output shaft and engaging the coaxial shaft with the output shaft to transmit power to the output shaft, the planetary wheel set and the coupling means being mounted on the same shaft, whereby at the transition between the first driving stage and second driving stage, the first and second output means of the planetary wheel set are at substantially the same rate of rotation.

2. A gear unit as claimed in claim 1 wherein the intermediate shaft is selectively driven by the planetary wheel set when the gear unit is in a reverse driving stage, the intermediate shaft being adapted to drive a reverse driving shaft, and the reverse driving shaft being adapted to engage the output shaft through coupling means thereby to drive the output shaft in reverse.

3. A gear unit as claimed in either claim 1 or 2 wherein the planetary wheel set includes four shafts, the first shaft being a first internal gear responsive to the hydraulic rotational power, the second shaft being a second internal gear responsive to mechanical rotational power, and the first output means is the third shaft being a carrier for a first planetary pinion engaging with one of the internal gears, and a second planetary pinion engaging with the second internal gear, and the second output means is the fourth shaft being a first sun wheel mounted on the coaxial shaft and reactive to the transmitted rotational power.

4. A gear unit as claimed in claim 2 wherein the planetary wheel set drives the intermediate shaft in the first driving stage and the reverse driving stage through a carrier for planetary pinions, such carrier being connected with the intermediate shaft.

5. A gear unit as claimed in claim 3 wherein the planetary pinions are in engagement with each other.

6. A gear unit as claimed in claim 3 wherein the third and fourth shafts are selectively connected to the output shaft through the coupling means.

7. A gear unit as claimed in claim 3 wherein the coupling means is adapted in a first position to engage the third shaft with the output shaft and to disengage the fourth shaft from the output shaft, and in a second position simultaneously to engage the fourth shaft with the output shaft and to disengage the third shaft from the output shaft.

8. A gear unit as claimed in claim 1 including an extension of the input shaft, such extension being a power take off shaft.

9. A gear unit as claimed in claim 1 wherein the output shaft is in direct connection with a power take-off gear train, said train having two power take-off connections, one adapted for a front axle and the other for a rear axle.

10. A gear unit as claimed in claim 1 wherein the output shaft is connected to a bevel gear of an axle differential.

11. A gear unit as claimed in either claim 1 or claim 10, including a gear train connected to the output shaft, a coupling connected with the gear train, and a second auxiliary output shaft, such second auxiliary output being adapted to constitute the front wheel drive for a vehicle.

12. A gear unit as claimed in claim 1 or 10 including an extension shaft to the input shaft, such extension shaft being connected with an auxiliary power take-off shaft.

13. A hydrostatic-mechanical gear unit comprising an input shaft for receiving power from an engine, means for dividing power in the shaft into a hydraulic power branch and a mechanical power branch, the hydraulic power branch including a first hydrostatic unit operatively connected with a second hydrostatic unit, the input shaft being adapted to drive the first hydrostatic unit, and an output hydrostatic shaft adapted to be driven from the second hydrostatic unit, a planetary wheel set, gearing means for engaging the output hydrostatic shaft to transmit rotational power to said planetary wheel set, the mechanical power branch including gearing operatively engaging the input shaft and engaging the planetary wheel set, and adapted to impart rotational power to the planetary wheel set, the planetary wheel set being adapted to integrate the hydraulically activated rotation and the mechanically activated rotation, and intermediate shaft selectively driven by the planetary wheel set, and coupling means for engaging the intermediate shaft and an output shaft and to thereby transmit rotational power to the output shaft when the gear unit is in a first driving stage, a coaxial shaft about the intermediate shaft and adapted to be selectively driven by the planetary wheel set when the gear unit is in a second driving stage, the coupling means disengaging the intermediate shaft from the output shaft and engaging the coaxial shaft with the output shaft to transmit power to the output shaft, and wherein the hydrostatic units are located in tandem on a hydrostatic shaft adjacent to and parallel with the input shaft, the input shaft having a gear wheel stage including a gear wheel towards an output end the input shaft and mounted for rotation with the input shaft, the hydrostatic shaft having a gear wheel toward the input end of the hydrostatic shaft for engaging the output gear wheel, and a gear wheel stage on the output hydrostatic shaft such stage including a gear wheel engaging a gear wheel rotatable about the input end of the input shaft.

14. A gear unit as claimed in claim 13 wherein the intermediate shaft is located adjacent and parallel the input shaft, and the planetary wheel set is mounted concentrically relative the intermediate shaft.

15. A gear unit as claimed in claim 14 wherein the input shaft, the intermediate shaft, the reverse driving shaft and the hydrostatic shaft are mounted in substantially parallel relationship.

16. A gear unit as claimed in claim 13 wherein in the gear stage towards the input end of the input shaft is a double sun wheel, and the double sun wheel acts to drive a gear wheel rotatable on the intermediate shaft, such gear wheel being connected with an internal gear for the planetary wheel system.

17. A gear unit as claimed in claim 16 wherein the mechanical power branch gearing engaging the input shaft is substantially adjacent the gear wheel on the intermediate shaft driven by the double sun wheel.

18. A gear unit as claimed in claim 13, including an extension to the hydrostatic shaft such extension constituting a first auxiliary output shaft and such extension being responsive to the speed of the input shaft.

19. In a hydrostatic-mechanical gear unit with power branching wherein a hydrostatic gear unit includes a first hydrostatic unit and a second hydrostatic unit and wherein there are two forward and one reverse driving stages, and wherein a hydraulic power branch and a mechanical power branch on an input side are combined in an integrator gear unit including a planetary wheel gear unit with each driving stage having loaded shafts and one unloaded shaft, and as a function of the respective driving stages, additional power flows from the integrator gear unit through one of two output shafts the improvement being that, in the first forward driving stage, a first output shaft of the integrator gear unit is directly connectable to an output side through coupling means; in the reverse stage, a first output shaft of the integrator gear unit is connectable to the output side through an additional power line and coupling means; and, in the second forward driving stage, a second output shaft of the integrator gear unit is directly connectable to the output side through coupling means, the first output shaft and the second output shaft being adapted to rotate at substantially the same speed at a transition between the first forward stage and second forward stage.

20. In a hydrostatic-mechanical gear unit with power branching wherein a hydrostatic gear unit includes a first hydrostatic unit of continuously changing volume and a second hydrostatic unit of a substantially constant volume, wherein there are two forward and one reverse driving stages, and wherein a hydraulic power branch and a mechanical power branch on an input side are combined in an integrator gear unit including a four-shafted planetary wheel gear unit with each driving stage having three loaded shafts and one unloaded shaft, and as a function of the respective driving stages, additional power flows from the integrator gear unit through one of two outputs shafts, the improvement being that, in the first forward driving stage, the first output shaft is a satellite carrier of the integrator gear unit and is directly connectable to an output shaft of the unit through coupling means; in the reverse stage, a first output shaft is said satellite carrier gear unit and is connectable to the output shaft of the unit through an additional power line and coupling means; and in the second forward stage, a second output shaft is a sun wheel of the integrator gear unit and is directly connectable to an output shaft through coupling means, wherein the satellite carrier and the sun wheel are adapted to rotate at substantially the same speed at a transition between the first driving stage and a second driving stage.

* * * * *